Figure 1:
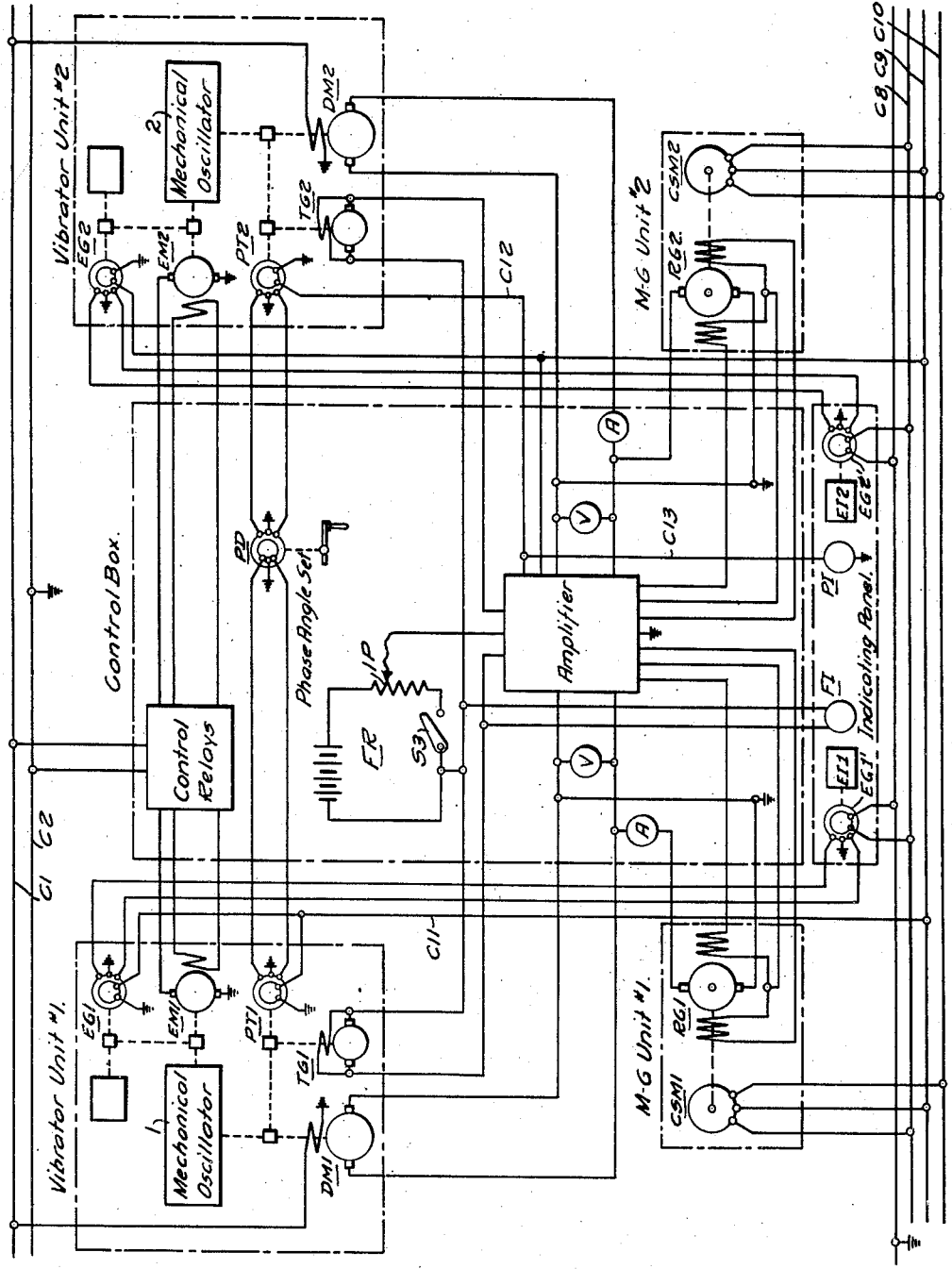

Dec. 14, 1948.　　　　S. W. HERWALD ET AL　　　　2,456,508
ELECTRIC MOTOR CONTROL SYSTEM
Filed June 14, 1945　　　　　　　　　　　　　　　3 Sheets-Sheet 1

INVENTORS
Seymour W. Herwald
and Harold M. Watson.
BY
Paul E. Friedemann
ATTORNEY

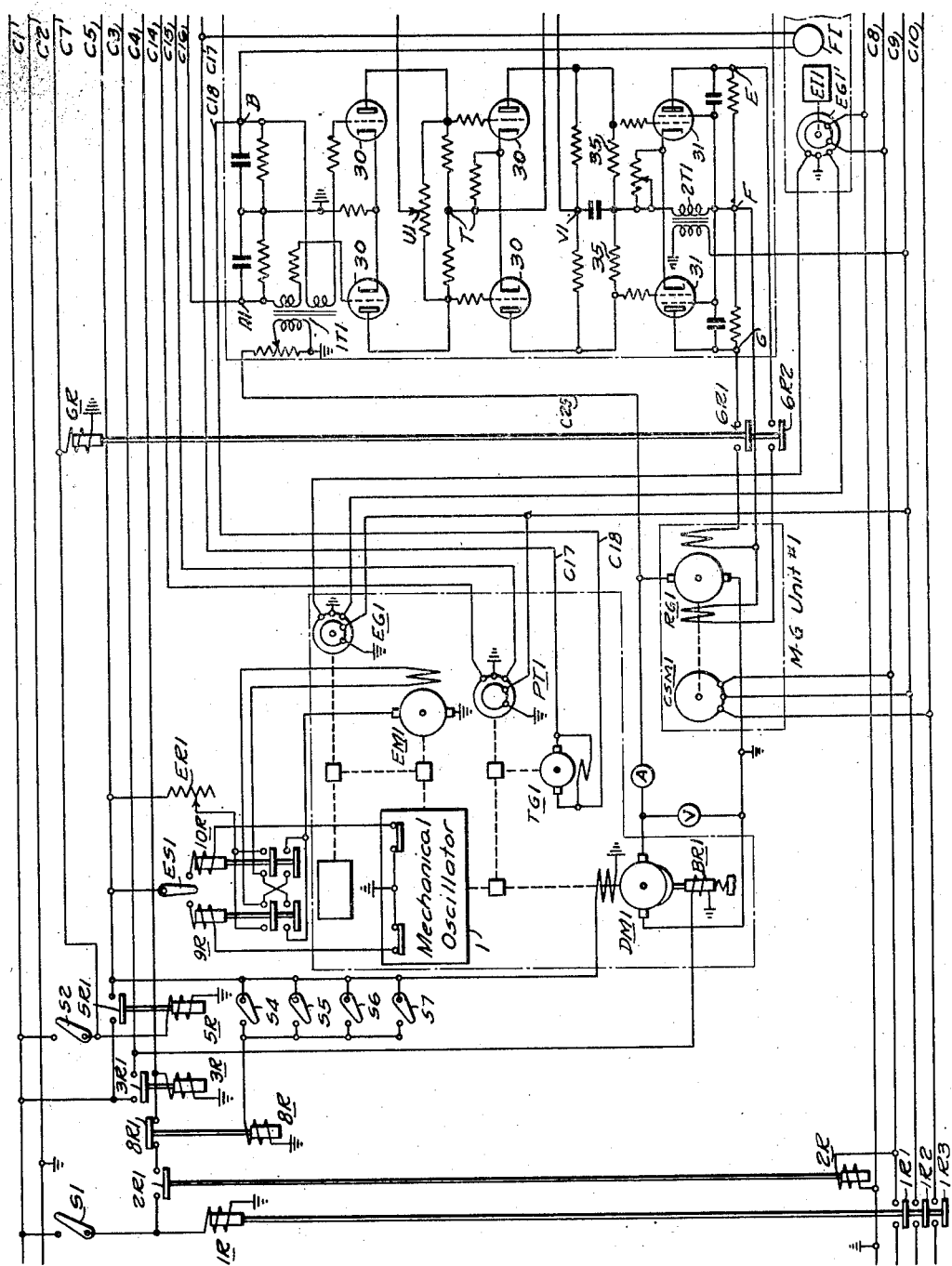

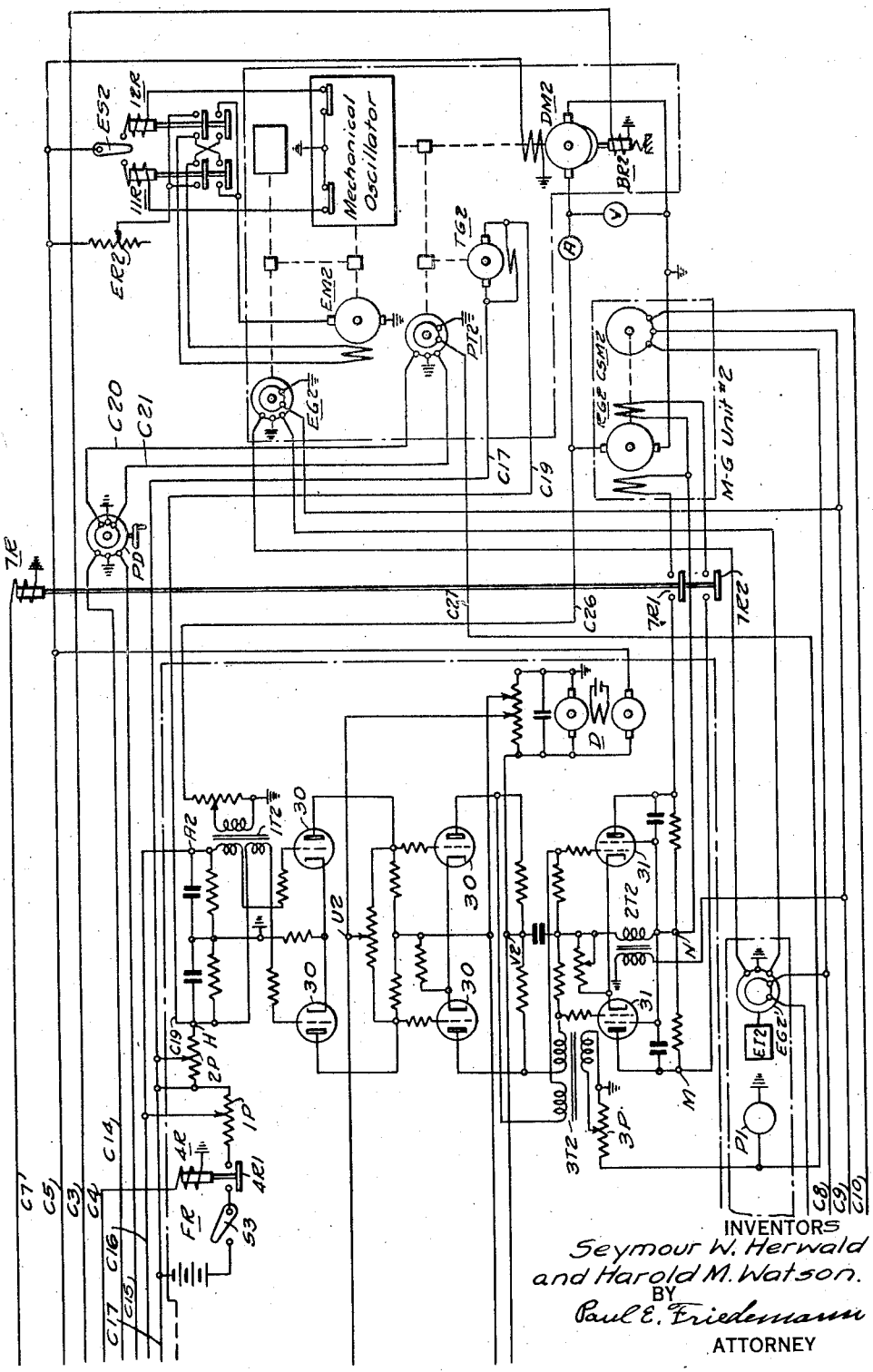

Patented Dec. 14, 1948

2,456,508

UNITED STATES PATENT OFFICE 2,456,508

ELECTRIC MOTOR CONTROL SYSTEM

Seymour W. Herwald and Harold M. Watson, Pittsburgh, Pa., assignors to Westinghouse Electric Corporation, East Pittsburgh, Pa., a corporation of Pennsylvania Application June 14, 1945, Serial No. 599,345

15 Claims. (Cl. 318—77)

This invention relates, generally, to electrical control systems and, more particularly, to such control systems which provide regulation of an element to be controlled according to a function of the movements of a reference element.

The principles of this invention, by way of illustration but not limitation, are set forth in the drawings, and the following specification is a specific embodiment which provides synchronized operation as to speed or period, over a variable range, of the vibrating elements of a pair of mechanical oscillators, with any desired phase angle relation from 0° to 360° between the vibration periods of the vibrating elements.

The control arrangement is susceptible of wide application in the control of relatively movable members, examples being had in the control of paper mill rolls wherein the peripheral speeds of the rolls of the various roll sets must be accurately controlled for successful operation, and the follow up control of gun turrets in accordance with the movements of a sighting device.

One object of this invention is to provide an electrical control system for controlling the movements of an element to be controlled as a function of the movements of a reference element which is simple in its elements and positive in operation.

Another object of this invention is to provide a control system for synchronizing the movements of a pair of mechanically independent elements which is so arranged that the synchronizing control quantities are inherently small.

Another object of this invention is to provide a system of the character mentioned in which accurate control of the speed of operation of a pair of elements is obtained.

A further object of this invention is to provide a system of the character referred to in which close control of the phase relationship of the movements of a pair of elements with respect to a predetermined phase relation is had.

Yet another object of this invention is to provide a system for controlling the movements of a pair of elements in which the operating frequency and the phase relation of the movements of the elements may be remotely regulated.

A specific object of this invention is to provide a control system for a pair of mechanical oscillators which provides for the remote control of the frequencies of the mechanical oscillators, the phase relation of the oscillator frequencies and the magnitude of the forces exerted by each oscillator.

Another specific object of this invention is to provide a system for controlling a pair of mechanical oscillators in which provision is had for quick stopping of the oscillators.

Other objects and advantages will become apparent upon a study of the following disclosure when considered in conjunction with the accompanying drawings, in which:

Figure 1 is a schematic diagram of a control apparatus embodying the principles of this invention; and Fig. 2 which is divided into Fig. 2a and Fig. 2b, is a more detailed diagrammatic showing of the invention illustrated in Fig. 1.

In the usual case of follow up control of the movements of a controlled unit depending upon movements of a reference unit, the entire power for synchronizing the movements of a controlled unit with movements of the reference unit is obtained as a function of the position difference or displacement between the units. Systems of this type ordinarily require relatively large position signal transmitting and receiving elements that a sufficiently large error quantity for synchronizing the movements of the units may be obtained. In the case of rotating members, synchrotie generators and transformers are frequently employed, respectively, to transmit angular positions of the master or reference rotating member and to produce error quantities representing the angular difference of the follow up member with respect to the reference member. With such an arrangement the rotatable members are, in effect, operating at random speeds, and the entire power for controlling the follow up member is obtained as a function of the angular difference between the members represented in the error quantity produced at the synchrotie transformer. For close follow up control, the acceleration of the follow up member must be high and, as a consequence, apparatus capable of producing large control quantities is essential. Systems of this type are inherently difficult to stabilize.

This invention provides a control arrangement wherein all but a very small part of the synchronizing power is handled as a function of the speed difference between the reference member and the follow up member. Thus, the quantity representative of the angular difference between the members need be but a fraction of that in the above-described system to provide precise synchronizing control. This conclusion follows from the fact that considerably less power is required to synchronize the movements of a pair of members operating at approximately the same speeds than a pair operating at random speeds.

Since a speed regulator is much easier to stabilize than a position regulator, a system in which most of the power is handled as a function of speed can be made more accurate.

A control arrangement embodying the foregoing control principles, together with other novel control features, is illustrated in Fig. 1 wherein the control system is utilized to control a pair of mechanical oscillators. This system includes six main elements as follows: Vibrator unit #1, including the mechanical oscillator 1 which is the reference oscillator; vibrator unit #2, including the mechanical oscillator 2 which is the controlled oscillator; M-G unit #1 and M-G unit #2, respectively, including the regulating generators RG1 and RG2 which form the basic control equipment of the system for controlling the speed or frequency and force phase relationship of the oscillators; a control box including, among other regulating devices hereinafter covered in detail, an amplifier control which comprises a two channel amplifier, one channel for each of the vibrator units and the associated motor generator sets, which channels of the amplifier are each fed for the most part from one of the vibrator units and their output utilized to control the associated regulating generator; and the final system element is the indicating panel at which indications of oscillator speed or frequency, of oscillator phase angle error and of oscillator force unbalance or eccentricity are obtained. In practice, a clock is provided on the indicating panel. This indicating panel provides a complete indication of the tests being made, together with the time of the test, and is compactly arranged for photographing. A direct-current supply for distribution in the system through the control relays in the control box is obtained from conductors C1 and C2, and a suitable three-phase alternating-current supply for operating the constant speed motors CSM1 and CSM2 of the motor generator units and for energizing the synchrotie machines as well as other system elements is obtained from the conductors C8, C9 and C1.

Each of the vibrator units as blocked in dot-dash outline is a unit mechanical assembly on a rigid support with the various motors and synchrotie generators or receivers supported to move with the mechanical oscillator thereof. The structural details of the mechanical oscillators form no part of this invention and, hence, are illustrated only in block form, it being felt sufficient to state that each unit includes the equivalent of a pair of masses which rotate in opposite directions, the arrangement being such that dynamic balance longitudinally of the oscillators is had whether or not mass eccentricity with respect to the rotational axis exists, and the phase relation of the mass eccentricities with respect to the rotational axis is such that during mass rotation the forces resulting from mass unbalance are cancelled, that is, are 180° out of phase in one plane while in a plane at right angles thereto the forces are cumulative. As a consequence, with each complete rotation of the masses an alternating force cycle acting in a single plane is produced. Provision is also had for simultaneously equally adjusting the eccentricity of all the masses of a single oscillator while the masses are rotating. For further detailed information relating to the mechanical oscillators and to variants of the type of oscillator above described, reference may be had to ASME Paper No. 45-A-11, entitled Mechanical Oscillators and Their Electrical Synchronization, by S. W. Herwald, R. W. Gemmell and B. J. Lazan.

Each of the mechanical oscillators are powered by a direct-current driving motor respectively designated DM1 and DM2. These motors drive the masses of the oscillators in rotation. For adjusting the mass eccentricities of the oscillators, eccentricity motors EM1 and EM2 are respectively provided. Indications of the speed or frequency of each oscillator unit 1 and 2 is obtained by means of the tachometer generators TG1 and TG2, which are each driven at a speed proportional to its associated oscillator. Indications of position or phase of the mass of oscillator 1 are provided by the phase or position generator PT1 which is the generating element of a synchrotie system. The single-phase rotor of this generator represented by the inner concentric circle being directly mechanically tied to the drive for the rotating masses in mechanical oscillator 1 to rotate at the same speed. The primary winding carried by this rotor is energized with single-phase alternating-current over the conductor C11 from C3, the other side of the winding being grounded. Mechanical oscillator 2 is similarly equipped with a position or phase transformer PT2, the rotor of which represented by the inner concentric circle is energized by induction from the three primary windings carried by the stator and is driven directly from the drive for the rotating masses of oscillator 2. The three stator (secondary) windings of the position generator PT1 are connected with the three primary windings of the position transformer through a position differential synchrotie unit PD which, by setting of its secondary carrying rotor in predetermined angular relation with its primary carrying stator, introduces a phase shift between its input and output voltages to provide a predetermined phase shift between the secondary voltage of the generator PG1 and the primary voltage of the transformer PT2. The rotor of the position transformer is so mechanically arranged with the rotating masses of oscillator 2 that for proper mechanical phase relation of the masses of the oscillators 1 and 2 the voltage generated in the transformer rotor is zero. This is the position in which the rotor coil axis of the transformer is in quadrature with the primary flux thereof. The output of the transformer secondary is supplied to the amplifier over conductor C12 and is the phase angle error voltage as distinguished from the phase angle voltage obtained at the position differential synchrotie PD. The output of the transformer secondary is also supplied to the phase error indicator PI over conductor C13. Instrument PI is conveniently calibrated in mechanical degrees of error between the angular position of the masses of oscillator 2 with respect to those of oscillator 1. By reason of the adjustment in phase relation of the generated voltage at the generator PG1 and the received voltage at transformer PT2, the mechanical phase relation of the rotating masses of the oscillators is determined and may be set for any mechanical phase angle from 0° to 360° by the handwheel at the differential PD, which for convenience may have a scale associated therewith calibrated in mechanical degrees of angular displacement of the oscillator masses.

Indications of mass eccentricity are obtained at the indicating panel through separate synchrotie systems associated with each of the mechanical oscillators. Eccentricity synchrotie generators EG1 and EG2 are respectively provided for each of the oscillators 1 and 2 and are driven at a speed proportional to that of eccentricity drive motors EM1 and EM2. Synchrotie generators EG1' and EG2' drive the eccentricity indicators EI1 and EI2, these indicators being of the form of small geared counters having sequentially operated numeral carrying discs moved into proper position by rotation of the input drive therefor. The synchrotie units are energized and connected in the conventional manner.

Speed control of the drive motors DM1 and DM2 and, hence, control of the vibration frequency of the mechanical oscillators is obtained at the frequency regulator FR, which includes the battery and the potentiometer 1P by selecting a preset portion of the battery voltage at the potentiometer and matching it against the paralleled outputs of the tachometer generators TG1 and TG2. The voltage difference between each tachometer generator and the selected battery voltage is fed into the associated channel of the two channel amplifier. The output of each amplifier channel when regulation by the differential voltages is had, produces an unbalanced excitation in the split field systems of each regulating generator to cause outputs thereof proportional to the differential voltages fed into the respective amplifier channels. The armature of each regulating generator is connected in series with the armature of the oscillator drive motor which it controls and thus changes the speed of the motor so as to reduce the voltage error between the tachometer generator and the selected portion of the battery voltage. Thus, except for a very small voltage differential required to produce enough output voltage at the regulating generators to maintain the speed of the respective oscillator drive motors, the system is self-compensating, always tending to reduce the speed voltage error. Since a direct-current tachometer generator produces an output varying linearly with speed, all that is necessary to adjust the oscillator frequency is to adjust the frequency regulator potentiometer 1P. Thus both mechanical oscillators are speed regulated. Indications of mechanical oscillator frequency are obtained at the frequency indicator F1 by connecting the terminals thereof across the output terminals of the tachometer generator TG1.

With close speed matching of the two mechanical oscillators as provided in the present system, there now remains only the problem of synchronizing the oscillator frequencies as to period in any preselected phase relation. The synchrotie system including the position transformer PT2, the output of which, as previously mentioned, is fed into the amplifier, provides this synchronizing action. More specifically, the synchronizing control quantity from the transformer PT2 is superimposed upon the speed or frequency quantity in the amplifier channel associated with the tachometer generator TG2 thus providing the necessary control of the split field system of the regulating generator RG2 to closely synchronize the vibration period of the mechanical oscillator 2 with that of mechanical oscillator 1, the phase relation of the vibration period of mechanical oscillator 2 to that of oscillator 1 being conveniently variable over the range from 0° to 360° by proper adjustment of the position differential PD.

As in the case of all servomechanism or follow up control systems, proper damping means must be provided to properly stabilize the system and prevent hunting. In the present system such damping is obtained by feeding back a portion of the armature voltage of the regulating generators into the associated channels of the amplifier.

A more detailed understanding of the invention will be had from a study of Fig. 2 of the drawings wherein details of the two channel amplifier, the system of control relays and other circuit details purposely eliminated from Fig. 1 to simplify that illustration, are shown. As previously noted, the amplifier is of the two channel type, each channel being a three stage push-pull amplifier, using triode voltage amplifier tubes 30 in the first two stages and power amplifiers 31 in the last stage. While the voltage amplifier tubes are shown as individual triode tubes, it is, of course, apparent that a duplex triode such as the 6SL7 tube may be substituted for the pairs of push-pull connected triodes. The power amplifier tubes may be of the 6L6 type. The plate supply for the first two stages of each amplifier is direct current and is supplied by the dynamotor D through terminals U and V. The plate supply for the tubes 31 is alternating current supplied by the transformers 2T1 and 2T2. This plate supply should be in phase with the supply for the generator PG1. These transformers are shown separately as a matter of convenience. However, in practice, a single transformer having a pair of equal secondary outputs may be utilized.

The voltage applied across terminals A1 and B of the number one amplifier channel associated with mechanical oscillator 1 is the voltage difference between the battery voltage determined by the setting of the potentiometer 1P and the output of the tachometer generator TG1. This voltage is amplified in the two amplification stages provided by the tubes 30 and applied across the grid resistors 35 of the power amplifier tubes 31. Amplifier terminals E, F and G are connected through the contacts 6R1 and 6R2 across the split field system of the regulating generator RG1. The tubes 31 being power amplifiers deliver enough current to the regulating generator fields to control the armature voltage and, consequently, the speed or frequency of mechanical oscillator 1. Under normal conditions, when no voltage appears across terminals A1 and B, equal currents flow in the regulating generator fields, the arrangement being such that the total field flux under the conditions is zero. If a voltage is applied making B positive relative to A1, more current flows between terminals E and F than between G and F. The opposite is true if A1 is positive relative to B. The greater the voltage difference between terminals A1 and B, the greater is the current difference through the split regulating generator fields, thus affording an increase in the power supplied to the drive motor DM1 to speed up mechanical oscillator 1 and tachometer generator TG1 to bring about an approach of voltage equilibrium between the battery voltage and tachometer generator voltage.

The circuit arrangement by which the differential of the battery and tachometer generator voltages is applied to the number one channel is as follows: Conductor C16 applies a potential to the amplifier terminal A1, depending upon the setting of the slider of potentiometer 1P. Conductor C18 connects the positive side of the tachometer generator TG1 to the amplifier terminal B. The negative sides of the battery and the tachometer generator are connected by conductor C17. The battery is connected in a loop circuit with the switch S3 and contacts 4R1. When the switch and contacts are closed, battery current flows through the potentiometer IP. Thus, by adjusting the potentiometer slider, any suitable portion of the battery voltage may be applied to the terminal A1 to effect the desired regulation of the split field system of the regulating generator RG1.

Anti-hunt voltage is fed back from the regulating generator armature to the primary of transformer IT1 connected between conductor C25 and ground. This transformer has two secondaries each connected in one leg of the number one channel ahead of the first amplification stage. These anti-hunt voltages drive the grids of the first set of tubes 30 in opposite directions and thus introduce unbalance into the amplifier channel in a direction to oppose tendencies of the system to overshoot a condition of equilibrium.

Electrical balance of the entire number one channel is obtained by adjusting the terminal U1 along its potentiometer. Electrical balance is adjusted so that with terminal A1 shorted to terminal B, the currents in the plate circuits of the tubes 31 are equal.

In the case of the number two amplifier channel associated with the mechanical oscillator 2 speed or frequency, regulation is obtained in a manner similar to that afforded by the number one channel. Common conductor C17 connects the negative sides of the tachometer generator TG2 and the battery. Conductor C16 connects the slider of potentimeter IP to the input terminal A2 of the number two channel, while conductor C19 connects the positive side of tachometer generator TG2 to the terminal H. Thus, it will be seen that movement of the slider along potentiometer IP simultaneously changes the voltages applied to the terminals A1 and A2 of the two channels to simultaneously regulate in like amounts the excitation applied to the split field systems of the regulating generators.

Anti-hunt voltages are fed back from the armature of regulating generator RG2 to the primary of transformer IT2 connected between conductor C26 and ground, and thence the anti-hunt control is reflected in the secondaries thereof, which are connected ahead of the first amplifier stage similar to the secondaries of transformer IT1 previously described. Terminals U2 and V2 apply the dynamotor output voltage to the plate circuits of the triode amplifier tubes numbered 30, and transformer 2T2 introduces alternating current to the plate circuit of tubes 31. Output terminals P, N and M of the number two channel are connected to the split field system of the regulating generator RG2. Electrical balance of the number two channel is obtained by adjustment of terminal U2 along the potentiometer. Potentiometer 2P connected between conductor C17 and point H of the number two channel is provided to vary the electrical load on the tachometer generator TG2 so that its output exactly matches that of the tachometer generator TG1.

As hereinbefore briefly noted, the synchronizing voltage for the oscillator 2 is obtained from the position transformer PT2 and represents the error in angular position of the rotating elements of oscillator 2 with those of oscillator 1 for a given setting of the position differential PD. This voltage is introduced into the grid circuits of the tubes 31 through the medium of the transformer 3T2, the primary of which is connected across a tapped portion of the potentiometer 3P, in turn connected across the secondary of position transformer PT2 by the circuit including conductor C27 and ground. Transformer 3T2 has two identical secondary windings, one being connected in each leg of the number two channel. Hence, synchronizing quantities are applied to the grids of the two tubes 31. This connection superimposes the synchronizing voltage on the differential voltage introduced at terminals A2 and H providing a combination of voltages to properly synchronize the mechanical oscillator 2 with the mechanical oscillator 1. The amount of the synchronizing voltage applied to the grids of tubes 31 is determined by the setting of the potentiometer 3P and may be set to provide any follow-up stiffness the control current of which the regulating generator and other system components may handle.

The three secondary windings of the position generator PG1 are connected with the three primary windings of the position differential synchrotie unit PD by conductors C14, C15 and ground. The three secondary windings of the synchrotie unit PD are connected with the primaries of the position transformer PT2 by conductors C20, C21 and ground. The three stator windings of the position generator unit transmit the flux pattern set up by the rotatable primary thereof to the differential unit PD. This flux pattern is reflected in the secondary of the differential unit. Rotation of the synchrotie differential rotor actually rotates the flux pattern as obtained from the position generator. This physically rotated flux pattern is transmitted to the position transformer. If the synchrotie differential is in its zero position, that is, the position where the flux pattern is not rotated through the differential, the flux pattern set up in the position transformer PT2 is identical to that generated by the position generator. For every degree that the synchrotie differential is rotated from its zero position, the flux pattern in the position transformer is rotated a degree. If the position transformer secondary winding carrying rotor is rotated 90° from the transmitted flux, that is, the position in which the secondary winding magnetizing axis is normal to the flux axis, or in quadrature therewith, zero voltage is induced therein. In other words, if the synchrotie stators are properly indexed, the angular position of the transformer rotor at which zero secondary voltage exists represents angular position correspondence of the rotatable masses of mechanical oscillator 2 with mechanical oscillator 1. Rotation of the rotor of the position transformer in one direction from its zero voltage position induces an instantaneous voltage in one direction, whereas rotation in the opposite direction induces an instantaneous voltage 180° displaced from the first induced voltage. Thus a means is established whereby it is known whether oscillator 2 is leading or lagging oscillator 1. The error or synchronizing voltage thus produced and introduced into the number two amplifier channel by transformer 3T2 provides a control of the split field system of the regulating generator RG2 tending always to correct or minimize the phase error.

A number of control relays are utilized to provide proper protection and control of the system. Electromagnetic device IR is the contactor which controls the alternating-current supply to the system. It contacts IR1, IR2 and IR3 connect conductors C8, C9 and C10 to the alternating-current supply. This switch is energized upon closure of the manually operated switch S1. Relay 2R is energized upon alternating-current power application to the system and its contacts 2R1, which connect the conductor C4 to the positive conductor C1, control system shutdown in the event of alternating-current power failure. Relay 3R at its contacts 3R1 energizes the coils of brake relays BR1 and BR2 to release the brakes holding the oscillator drive motors DM1 and DM2. It is energized in a circuit including the switch S1, contacts 2R1 and contacts 8R1 in conductor C4 between positive conductor C1 and ground. Relay 4R like relay 3R responds to energizing of conductor C4. It is termed the normal stop relay and controls the closing of the frequency regulator circuit FR in conjunction with the normal stop switch S3. Relay 5R controls the application of direct current to the fields of the drive motors, the eccentricity motors and relays, the dynamotor and amplifier, etc. This relay is energized in a circuit between conductor C1 and ground which includes the direct-current power on switch S2. Relays 6R and 7R are energized when conductor C7 is energized upon closure of the switch S2. The respective contacts 6R1, 6R2 and 7R1, 7R2 control the connection of the amplifier output terminals to the split field systems of the two regulating generators. Relay 8R is the emergency stop relay. It is energized in a circuit between conductor C5 and ground, which includes any one of the parallel-connected emergency stop switches S4, S5, S6 or S7. Switch S4 may, for example, be located at the control box, while the remainder of the emergency stop switches may be remotely located at convenient observation points where oscillator vibration or vibration characteristics of some point on the member being tested may be observed. The contacts 8R1 of this relay open when the relay is energized and deenergize the conductor C4, thus dropping out the brake controlling relay 3R and setting the brakes, and at the same time deenergizing normal stop relay 4R thus providing both mechanical and dynamic braking of the motors. Relays 9R and 10R are selectively energized depending upon the position of eccentricity control switch ES1. These relays reversely connect the rotor and field of the eccentricity motor EM1 through their contacts between conductor C5 and ground. Eccentricity rheostat ER1 controls this motor's speed. Relays 11R and 12R selectively controlled by switch ES2 similarly reversibly energize the motor EM2, while rheostat ER2 controls the motor's speed. If desired, rheostats ER1 and ER2 may be connected on a common shaft and simultaneously regulated.

To operate the system the switch S1 is closed. This energizes the alternating-current power relay 1R which closes its contacts and starts constant speed motors CSM1 and CSM2 and applies alternating current to the amplifier. Relay 2R now picks up and energizes conductor C4 causing brake control relay 3R and normal stop relay 4R to pick up. The brakes on the drive motor are thus released and the frequency regulator circuit FR partially completed. Switch S2 is now closed, energizing conductor C7. Relays 6R and 7R connected between C7 and ground now pick up and, respectively, at their contacts 6R1, 6R2 and 7R1, 7R2 connect the split fields of the regulating generators RG1 and RG2 to their respective amplifier channels. Relay 5R, also energized when switch S2 is closed, energizes conductor C5 and applies direct current to the various system components as before mentioned.

Next the desired phase angle is set at synchrotie position differential PD. Normal stop switch S3 is moved to its closed position completing the frequency regulating circuit. The slider of the potentiometer IP, as a matter of good operating procedure, is usually set to zero before starting the system. Hence, zero potential is applied thereby to the amplifier terminals A1 and A2 and the drive motors for the oscillators are therefore not energized. The desired eccentricity setting for a given oscillator frequency is next made at switches ES1 and ES2, the speed of the eccentricity setting being controlled by the rheostats ER1 and ER2. Indications of the unbalanced setting of the oscillators' masses is had at the indicators E11 and E12 through the synchrotie connection thereof with the eccentricity motors. Now the slider of the potentiometer IP is adjusted for the desired speed or vibration frequency setting. This raises the potential of terminals A1 and A2 and produces an unbalance in the field excitation of generators RG1 and RG2. The drive motors accelerate and the tachometer generator output approaches that of the frequency regulator potentiometer setting. The position transformer synchronizing voltage works additionally on the fields of generator RG2 to provide the close synchronized regulation in the predetermined phase relation as set at PD.

For normal stopping the switch S2 is opened and causes electrical braking to take place. The speed of the oscillators' drive motors is directly proportional to the voltage applied to the amplifier from the battery circuit. Thus if the battery circuit is opened the drive motors are regulated for zero speed and must stop. Actual stopping is very rapid and usually takes place in less than one cycle. The reason for this is apparent in the amplifier control. The voltage applied by the potentiometer to terminals A1 and A2 tends to drive the drive motors DM1 and DM2 in what may be called the forward direction, whereas the voltage applied by TG1 and TG2 respectively to terminals B and H has the reverse effect on the motors. Opening of switch S2 and sudden dropping of terminals A1 and A2 to zero applies a heavy reversed control current to the drive motor armatures. The drive motors attempt to decelerate and reverse. However, the reversing polarity is removed from B and H just as fast as the speed falls off because the tachometer generator speed falls with the drive motor speed. At zero speed the terminals A1, B and A2, H are all at zero potential and the total output of each amplifier channel is zero.

Emergency stopping as previously pointed out may be had at any one of switches S4 to S7, inclusive.

The foregoing disclosure and the showings made in the drawings are merely illustrative of the principles of this invention and are not to be interpreted in a limiting sense. The only limitations are to be determined from the scope of the appended claims.

We claim as our invention:

1. A control system for a pair of motors comprising, in combination, means for producing a control electrical quantity, means for producing an electrical quantity for each of said motors depending upon the speed of operation of the associated motor, means for energizing each of said motors depending upon the differential of the electrical speed quantity associated therewith and the said control electrical quantity, means for producing a quantity representative of the phase angle disagreement of said motors, and means for utilizing said quantity to additionally regulate one of said motors.

2. In combination, a reference member, a controlled member, means for producing an electrical quantity for operating both said members, means for producing an electrical quantity for each of said members which varies depending upon variations in the operation of the member it is associated with, means for applying said second-mentioned electrical quantities in opposition to said first-mentioned electrical quantity, means for producing an electrical quantity which varies depending upon the positional disagreement of said controlled member with respect to said reference member, and means for utilizing said last-mentioned quantity to additionally regulate one of said members.

3. In combination, a reference member, a controlled member, means for producing a control electrical quantity, means for producing an electrical quantity having a value depending upon the operation of said reference member, means for producing an electrical quantity having a value depending upon the operation of said controlled member, means for controlling the reference member according to the differential of the control quantity and the reference member quantity, means for controlling the controlled member according to the differential of the control quantity and the controlled member quantity, means for producing an electrical quantity which varies depending upon the positional disagreement of the controlled member with respect to the reference member, and means for additionally controlling one of said members according to said last-mentioned quantity.

4. In combination, a first member, a second member, electrical means for each of said members for operating said members, means for producing a control electrical quantity, means for producing an electrical quantity proportional to the operation of said first member, means for producing an electrical quantity proportional to the operation of said second member, means for energizing the electrical means associated with the first member according to the differential of said control quantity and said quantity proportional to the operation of said first member, means for energizing the electrical means associated with the second member according to the differential of said control quantity and said quantity proportional to the operation of said second member, means for producing an electrical quantity having a characteristic depending upon the position of said first member, means for changing the characteristic of said position quantity, means for producing an electrical quantity depending upon the positional disagreement of said second member and said position quantity, and means for utilizing said last-mentioned quantity to additionally control one of said members.

5. In combination, a first member, a second member, motor means for each of said members for operating said members, a first generator driven proportional to the speed of said first member, a second generator driven proportional to the speed of said second member, means for producing a control electrical quantity, means for energizing the motor means associated with the first member depending upon the differential of said control quantity and the electrical output of said first generator, means for energizing the motor means associated with said second member depending upon the differential of said control quantity and the electrical output of said second generator, means for producing an electrical quantity depending upon the positional disagreement of the first and second members, and means for utilizing said last-mentioned quantity to additionally control one of said members.

6. In combination, a first member, a second member, motor means for each of said members for operating said members, a first generator driven proportional to the speed of said first member, a second generator driven proportional to the speed of said second member, means for producing a control electrical quantity, means for energizing the motor means associated with the first member depending upon the differential of said control quantity and the electrical output of said first generator, means for energizing the motor means associated with said second member depending upon the differential of said control quantity and the electrical output of said second generator, a synchrotie generator operated according to the movements of one of said members, a synchrotie transformer operated according to the movements of the other of said members, circuit means including a synchrotie differential connecting the synchrotie generator and transformer, and means for additionally controlling one of said members depending upon the electrical output of said synchrotie transformer.

7. In combination, a first member, a second member, motor means for each of said members for operating said members, a first generator driven proportional to the speed of said first member, a second generator driven proportional to the speed of said second member, means for producing a control electrical quantity, means for energizing the motor means associated with the first member depending upon the differential of said control quantity and the electrical output of said first generator, means for energizing the motor means associated with said second member depending upon the differential of said control quantity and the electrical output of said second generator, a synchrotie generator operated according to the movements of one of said members, a synchrotie transformer operated according to the movements of the other of said members, circuit means including a synchrotie differential connecting the synchrotie generator and transformer, means for additionally controlling one of said members depending upon the electrical output of said synchrotie transformer, and means for dynamically braking said motor means including means for eliminating said control electrical quantity.

8. A system of control for a motor comprising, in combination, a generator for energizing said motor, said generator having field windings, means for producing a first electrical quantity, impedance means energized according to said first electrical quantity, circuit means adjustably connecting said field windings with said impedance means for effecting energization of said field windings in one direction, means for producing a second electrical quantity depending upon the speed of operation of said motor, circuit means for reversely energizing said field windings depending upon the value of said second electrical quantity, and switching means for connecting and disconnecting said impedance means and said means for producing said first electrical quantity.

9. A system for synchronizing the operation of a plurality of motors comprising, in combination, means for producing a control electrical quantity, means for energizing said motors in dependence of said electrical quantity, means for each of said motors for producing an electrical quantity in dependence of the speed of operation of the associated motor, circuit means for individually opposing each of said second mentioned electrical quantities to said control electrical quantity for simultaneously regulating the speed of all said motors to obtain substantially the same operating speeds, and means responsive to the mechanical phase angle error between one of said motors and each of the remainder of said motors for additionally controlling each of the remainder of said motors.

10. A system for synchronizing the operation of a pair of motors comprising, in combination, means for producing a control electrical quantity, means for energizing said motors in dependence of said electrical quantity, means for each of said motors for producing an electrical quantity in dependence of the speed of operation of the associated motor, circuit means for individually opposing each of said second mentioned electrical quantities to said control electrical quantity for simultaneously regulating the speed of operation of each motor to obtain substantially the same operating speeds, and means responsive to the mechanical phase angle error between said motors for additionally controlling one of said motors.

11. A mechanical oscillator control system comprising, in combination, a first mechanical oscillator, a second mechanical oscillator, a drive motor for the first oscillator, a drive motor for the second oscillator, a generator driven at a speed proportional to the speed of the first oscillator, a generator driven at a speed proportional to the speed of the second oscillator, a source of electrical energy, generating means for each of said drive motors, circuit means connecting said source of electrical energy with each of said generating means to excite said generating means, circuit means connecting the generator associated with the first oscillator to excite the generating means for the first oscillator in opposition to the excitation applied by said source, circuit means connecting the generator associated with the second oscillator to excite the generating means for the second oscillator in opposition to the excitation applied by said source, a synchrotie generator driven by the first oscillator, a synchrotie transformer driven by the second oscillator, circuit means interconnecting the synchrotie generator and transformer, means for applying the output of said synchrotie generator to excite one of said generating means, an eccentricity control motor for each of said oscillators for changing the mechanical unbalance of the oscillators, means for selectively energizing each of said eccentricity motors in either direction to effect increases or decreases in mechanical unbalance in each oscillator, means for controlling the speed of said motors, means including a synchrotie generator for each eccentricity motor driven depending upon the operation of each eccentricity motor and a synchrotie receiver for each synchrotie generator, means operated by each synchrotie receiver for separately indicating the mechanical unbalance of the associated oscillator, means responsive to the output of the synchrotie transformer for indicating the mechanical phase angle error between the oscillators, means responsive to the terminal voltage of one of said generators driven in proportion to the oscillator speeds for indicating the frequency of operation of said oscillators, and switching means for connecting and disconnecting said source of electrical energy with both said generating means.

12. Control means for a pair of motors comprising, in combination, a pair of electrical systems, one for energizing each of said motors, each of said systems having a pair of input terminals and being normally balanced when the potentials of the terminals of each pair are the same and each being unbalanced and having an electrical output of magnitude and direction depending upon the potential difference of the pair of terminals associated therewith, means for simultaneously applying an electrical potential of predetermined magnitude to one terminal of a pair of said terminals and to the corresponding terminal of the other of said pair of terminals to cause operation of said motors in one direction, means for applying electrical potentials to the remaining terminal in each of said pair of terminals corresponding to the operating speed of the associated motor, and means for modifying the electrical unbalance of one of said normally electricallly balanced systems in dependence of the phase angle error of said motors.

13. Control means for a pair of motors comprising, in combination, speed reference means, means for energizing each motor in dependence of the differential of the operating speed of each of said motors and the speed value indicated by said speed reference means, and means for modifying the differential of the indicated reference speed and operating speed of one of the said motors in dependence of the phase angle error of said motors.

14. Control means for a motor comprising, in combination, speed reference means for indicating predetermined speed values, means for energizing said motor in dependence of the differential of the speed value indicated by said speed reference means and the operating speed of said motor and means for instantaneously reducing the speed value indicated by said speed reference means to zero.

15. Control means for a motor comprising, in combination, an electrical system for energizing said motor, said system having a pair of input terminals and being normally balanced when said terminals are of like potential and being unbalanced and having an electrical output of magnitude and direction depending upon the potential differences of said pair of terminals, electrical means for producing a first electrical potential representative of a selected operating speed of said motor, means for applying said first electrical potential to one of said pair of terminals, means responsive to rotative movements of said motor for producing a second electrical potential corresponding to said rotative movements, means for applying said second electrical potential to the other of said pair of terminals, and means for instantaneously reducing said first electrical potential to zero.

SEYMOUR W. HERWALD.
HAROLD M. WATSON.

REFERENCES CITED

The following references are of record in the file of this patent:

UNITED STATES PATENTS

| Number | Name | Date |
| --- | --- | --- |
| 2,352,050 | Wegener | June 20, 1944 |
| 2,376,035 | Collings, Jr. | May 15, 1945 |